W. H. BIHN.
EGG TURNER.
APPLICATION FILED JULY 20, 1921.
1,422,250.
Patented July 11, 1922.
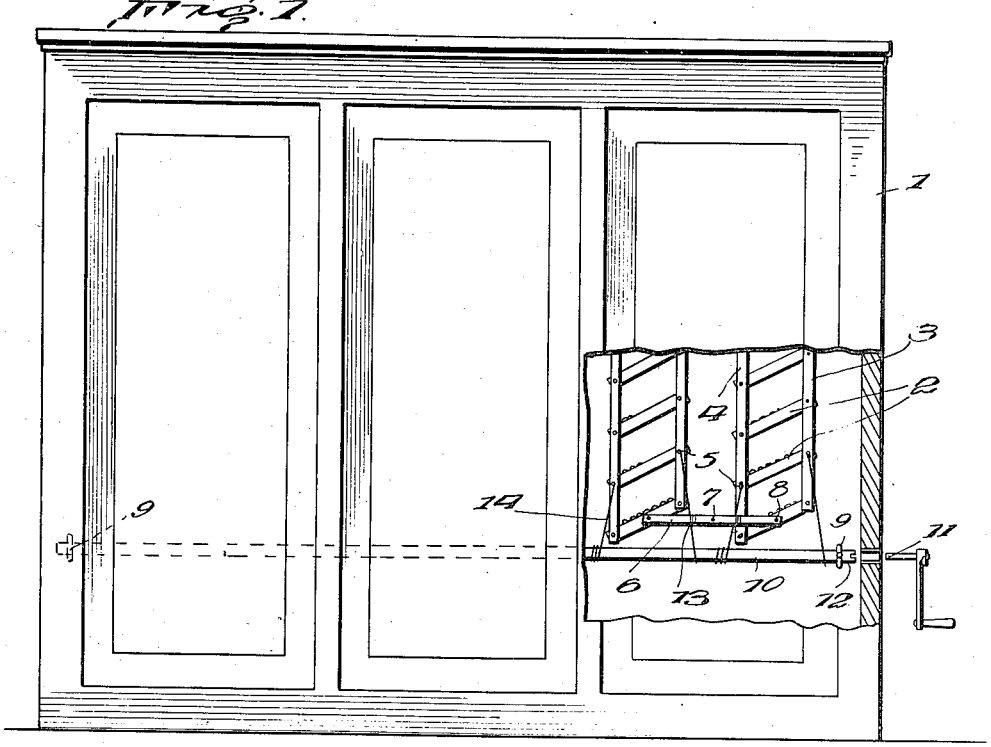
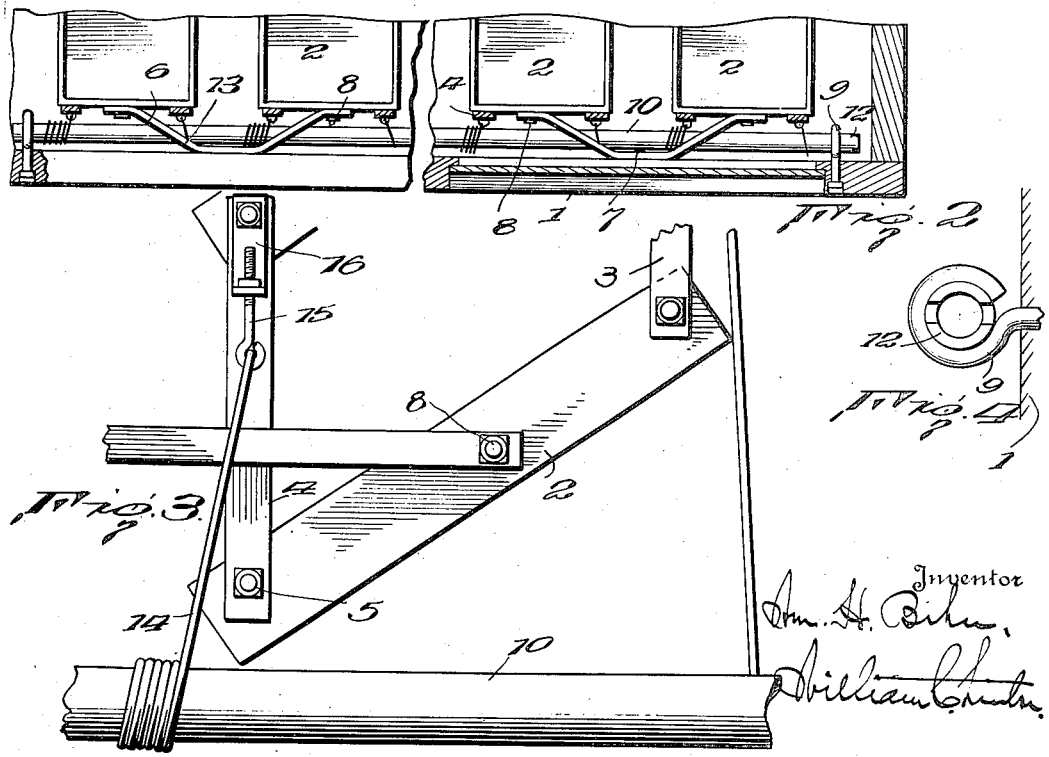

UNITED STATES PATENT OFFICE.

WILLIAM H. BIHN, OF PETALUMA, CALIFORNIA.

EGG TURNER.

1,422,250. Specification of Letters Patent. Patented July 11, 1922.

Application filed July 20, 1921. Serial No. 486,219.

*To all whom it may concern:*

Be it known that I, WILLIAM H. BIHN, a citizen of the United States of America, residing at Petaluma, in the county of Sonoma and State of California, have invented certain new and useful Improvements in Egg Turners; and I do hereby declare that the following is a full, clear, and exact description of the invention, such as will enable others skilled in the art to which it appertains to make and use the same.

This invention relates to improvements in incubators having for an object to provide a novel and practical form of egg turning device therefor, whereby the eggs can be uniformly turned without liability of injury in order that application of heat may be had to all surfaces of the same, the invention comprehending means for collectively varying the positioning of the various egg supporting racks or trays, which are arranged in unit fashion, in a single operation.

It is also an object of the invention to provide means whereby the extent of movement of the egg retaining racks or trays may be regulated as desired, such regulation being to individually or collectively affect the various units of racks or trays in the incubator.

Other objects will be in part obvious and in part pointed out hereinafter.

In order that the invention and its mode of operation may be readily understood by persons skilled in the art, I have in the accompanying illustrative drawings and in the detailed following description based thereon, set out one embodiment of the same.

In these drawings:

Figure 1 is a side elevation of an incubator provided with my improved egg turning device, a portion of said incubator being broken away and shown in section to illustrate the arrangement of the egg turning devices;

Figure 2 is a fragmentary horizontal section through the incubator showing the mounting of the various trays therein;

Figure 3 is an enlarged fragmentary detail in side elevation showing the means for moving the various egg retaining racks or trays and the adjustable connection of said means with one of the tray units; and, Figure 4 is a fragmentary detail in elevation showing the mounting of the drum of the incubator tray operating means.

Having more particular reference to the drawings, in connection with which like characters of reference will designate corresponding parts throughout, I have shown my improved egg turning device as applied to an incubator 1 wherein a plurality of egg-retaining racks or trays 2 are mounted in superposed fashion and are pivotally inter-connected at their opposite ends by means of bars 3 and 4, said bars, as will be noted, having pivotal connection at 5 with the end portions of the various racks 2 at points in proximity to the opposite sides thereof. Thus, it is to be understood that these racks are arranged in unit fashion and that the units so constituted will cause collective operation of the particular trays included thereby. As means for supporting the racks of the various units, double bracket arms 6 are secured to the opposite side walls of the incubator housing 1 as at 7 and are pivotally connected to said outermost racks as at 8; the opposite extremities of the double bracket arms, obviously, serving to support a pair of rack units as clearly shown in the Figures 1 and 2.

Eggs to be hatched in the incubator 1 are, of course, arranged in juxtaposed relation in the various racks 2 of the different units as shown in the Figure 1, whereupon the doors of the incubator are closed. During the incubating process, it becomes necessary to turn these eggs and such movement of the same is accomplished by rocking the various egg racks 2 of the different units to positions opposite from their initial positions. By this rocking action, it will be understood, that the eggs will be turned and in consequence, heat will be evenly and uniformly applied to all surfaces thereof.

As means for effecting such rocking movement of the racks 2 of the different rack units, I rotatably mount in the lower portion of the incubator housing in suitable bearings 9 a horizontal longitudinally disposed drum 10, arranging one end thereof adjacent an opening receiving a crank 11 and forming said end with a notch 12 whereby to receive the correspondingly formed inner end of the crank 11. In this way, it will be seen that with engagement of the crank 11 with the longitudinally disposed windlass drum 10, rotary motion may be imparted to the latter, as may be desired.

Cords 13 and 14, or any other suitable connections are engaged at certain of their ends with the connecting bars 3 and 4 of the different egg retaining rack units through the medium of an eye-screw 15, which in turn is adjustably received in a bracket 16 secured to each of said connecting bars 3 and 4; the free portions of these cords 13 and 14 being wound or coiled in opposite directions about adjacent portions of the longitudinal windlass drum 10 as shown in the Figure 1. Due to the opposite coiling of the cords 13 and 14 of the different egg retaining rack units about the drum 10, it is to be understood that while one of these cords, for instance the cord 13, is being wound about the drum 10, the remaining cord 14 will be unwound therefrom. Consequently, with rotation of the drum 10 through the medium of the crank 11 in a direction to cause winding of the cords 13 of the different egg retaining rack units about the same, pulls will be imparted to various ends of the various racks 2 connected by the bars 3, while the opposite ends of said racks will be permitted to move upwardly, due to the unwinding of the cords 14 from said drum. Thus, a rocking motion is imparted to the various egg retaining trays of the different units and accordingly, the positioning of the eggs turned thereby, will be changed to effect the even application of heat to all surfaces thereof. Obviously, with rotation of the drum 10 in an opposite direction to that above, the relative action of the cords 13 and 14 will be the opposite, so that the particular egg retaining racks connected thereto will be rocked in opposite directions for again changing the positioning of the eggs contained thereby.

The extent of movement of the various racks of the different units may be varied by merely adjusting their respective eye-screws 15 connected with the cords 13 and 14, so that greater or lesser pulls will be imparted to the bars 3 and 4 receiving the brackets 16. Thus, the extent of movement of the different egg retaining rack units may be individually regulated as necessary.

Manifestly, the construction shown is capable of considerable modification and such modification as is within the scope of my claims, I consider within the spirit of my invention.

I claim:

1. In combination with an incubator having a plurality of units of superposed pivotally supported trays therein, a windlass disposed longitudinally of the incubator and arranged within the same, and means connected to the opposite sides of said units of pivotally supported trays and engaged with said windlass in a manner to impart alternate pulls to the opposite sides of the units of trays upon rotation of said windlass.

2. In combination with an incubator having a plurality of units of superposed pivotally supported trays therein, a windlass disposed longitudinally of and mounted within the incubator, and means adjustably connected to the opposite sides of said units of pivotally supported trays engaged with said windlass in a manner to impart alternate pulls to the opposite sides of the trays upon rotation of the windlass.

3. In combination with an incubator having a plurality of units of superposed pivotally supported trays therein, a horizontal longitudinal windlass rotatably mounted in the lower portion of the incubator, and means connected to the opposite sides of said units of pivotally supported trays and engaged with said windlass in a manner to impart alternate pulls to the opposite sides thereof upon rotation of the windlass.

4. In combination with an incubator having a plurality of units of superposed racks pivotally mounted therein, a longitudinally disposed horizontal drum mounted in bearings in the lower portion of said incubator, a crank for said drum, oppositely disposed connecting bars pivotally engaging the opposite extremities of said racks and interconnecting the same, and flexible connection between said connecting bars and said drum, the flexible connection with certain of said bars and drum being opposite to the others, whereby to impart alternate pulls to the racks upon rotation of the drum.

5. In combination with an incubator having a plurality of units of superposed racks pivotally mounted therein, connecting bars pivotally engaging the opposite extremities of said racks and inter-connecting the same, a longitudinally disposed horizontal drum mounted in the lower portion of said incubator, a crank for the drum, flexible connection between said connecting bars and the drum, certain of said flexible connections being engaged with the drum in a manner opposite to the engagement of the remaining connections therewith, whereby to alternately impart pulls to the opposite sides of said rack upon rotation of the drum, and means on said connecting bars for permitting of adjustment of said connections with relation to the same.

In witness whereof I have hereunto set my hand.

WILLIAM H. BIHN.